(12) United States Patent
Bouffier et al.

(10) Patent No.: US 11,667,188 B2
(45) Date of Patent: Jun. 6, 2023

(54) OPERATING FLUID CONTAINER HAVING A COMPENSATION CONTAINER FOR COMPENSATING FOR PRESSURE FLUCTUATIONS IN THE OPERATING FLUID CONTAINER

(71) Applicant: KAUTEX TEXTRON GMBH & CO. KG, Bonn (DE)

(72) Inventors: Roman Bouffier, Koenigswinter (DE); Gernot Weiss, Neunkirchen-Seelscheid (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 646 days.

(21) Appl. No.: 16/633,772

(22) PCT Filed: Jul. 11, 2018

(86) PCT No.: PCT/EP2018/068842
§ 371 (c)(1),
(2) Date: Jan. 24, 2020

(87) PCT Pub. No.: WO2019/020381
PCT Pub. Date: Jan. 31, 2019

(65) Prior Publication Data
US 2020/0391586 A1    Dec. 17, 2020

(30) Foreign Application Priority Data

Jul. 26, 2017 (DE) .................... 10 2017 116 881.8

(51) Int. Cl.
*B60K 15/03* (2006.01)
*B60K 15/035* (2006.01)
(Continued)

(52) U.S. Cl.
CPC ........ *B60K 15/03519* (2013.01); *B32B 27/06* (2013.01); *B32B 27/32* (2013.01);
(Continued)

(58) Field of Classification Search
CPC ........... B60K 2015/03171; B60K 2015/03085; B60K 2015/03059; B60K 2015/03046; B60K 2015/03493; B60K 2015/0346
(Continued)

(56) References Cited

U.S. PATENT DOCUMENTS

| 3,477,611 A | 11/1969 | Niles |
| 3,693,825 A | 9/1972 | Richman |

(Continued)

FOREIGN PATENT DOCUMENTS

| CA | 2301030 | 9/1999 |
| CN | 105460118 | 4/2016 |

(Continued)

OTHER PUBLICATIONS

Office Action from related Japanese Appln. No. 2020-503946, dated Jan. 25, 2021. English translation attached.
(Continued)

*Primary Examiner* — Stephen J Castellano
(74) *Attorney, Agent, or Firm* — Grossman, Tucker, Perreault & Pfleger, PLLC

(57) ABSTRACT

An operating fluid container for a motor vehicle for accommodating an operating fluid. The operating fluid container has a compensation container that is at least indirectly fluidically connected to the atmosphere (ATM). The operating fluid container has the following features: the compensation container is situated within the operating fluid container in such a way that an outer surface of a compensation container upper shell is situated opposite from an inner surface of an operating fluid container upper shell; in
(Continued)

the event of positive pressure in the operating fluid container relative to the atmosphere, a compensation container volume decreases; and in the event of negative pressure in the operating fluid container relative to the atmosphere, the compensation container volume increases. The operating fluid container is characterized in that the compensation container upper shell opposite from the operating fluid container upper shell has a shape, at least in sections, that is complementary to the operating fluid container upper shell.

20 Claims, 4 Drawing Sheets

(51) Int. Cl.
  *B32B 27/06* (2006.01)
  *B32B 27/32* (2006.01)
  *B65D 47/32* (2006.01)
(52) U.S. Cl.
  CPC ...... *B65D 47/32* (2013.01); *B32B 2307/7242* (2013.01); *B32B 2439/40* (2013.01); *B60K 2015/03046* (2013.01); *B60K 2015/0346* (2013.01); *B60K 2015/03059* (2013.01); *B60K 2015/03085* (2013.01); *B60K 2015/03171* (2013.01); *B60K 2015/03493* (2013.01)
(58) Field of Classification Search
  USPC ................................ 220/721, 722, 723, 720
  See application file for complete search history.

(56) References Cited

U.S. PATENT DOCUMENTS

| | | | |
|---|---|---|---|
| 5,979,417 A | 11/1999 | Hyodo et al. | |
| 5,979,481 A | 11/1999 | Ayresman | |
| 6,549,110 B1 | 4/2003 | Baltes | |
| 7,231,933 B2* | 6/2007 | Kim | B60K 15/077 220/723 |
| 9,834,089 B2 | 12/2017 | Aso | |
| 2004/0071904 A1 | 4/2004 | Short | |
| 2004/0173624 A1* | 9/2004 | Carter | F24D 3/1008 220/720 |
| 2016/0368370 A1* | 12/2016 | Aso | G01F 23/292 |
| 2017/0087980 A1 | 3/2017 | Arras et al. | |

FOREIGN PATENT DOCUMENTS

| | | |
|---|---|---|
| DE | 3900499 | 7/1990 |
| DE | 3901978 | 9/1990 |
| DE | 10052399 | 5/2002 |
| DE | 102016104820 | 12/2016 |
| GB | 2281726 | 3/1995 |
| JP | 55-20652 | 2/1980 |
| JP | 64-16426 | 1/1989 |
| JP | 11-11167 | 1/1999 |
| KR | 10-2011-0054720 | 5/2011 |
| KR | 10-2014-0052600 | 5/2014 |
| WO | 00/22633 | 4/2000 |
| WO | 2010/104379 | 9/2010 |
| WO | 2016/012284 | 1/2016 |

OTHER PUBLICATIONS

Office Action from related Korean Appln. No. 10-2020-7005208, dated Feb. 10, 2021. English translation attached.
International Search Report, dated Oct. 24, 2018, received in corresponding PCT Application No. PCT/EP2018/068842.
International Preliminary Report on Patentability, dated Jan. 28, 2020, received in corresponding PCT Application No. PCT/EP2018/068842.

* cited by examiner

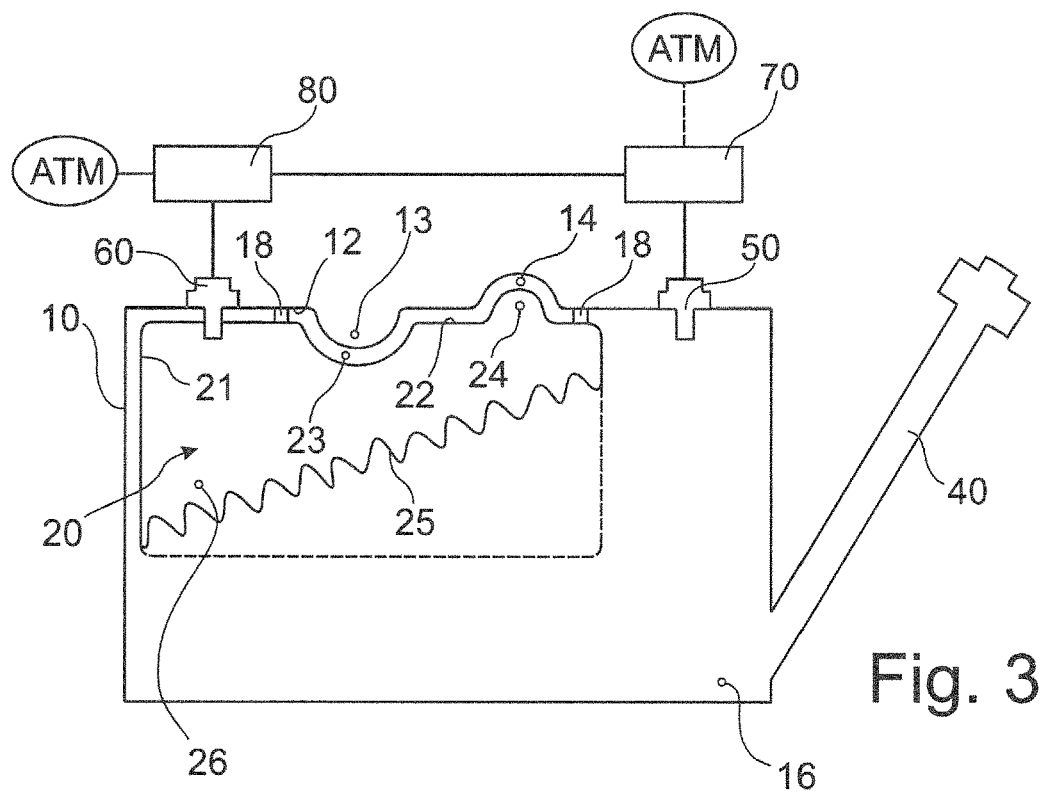
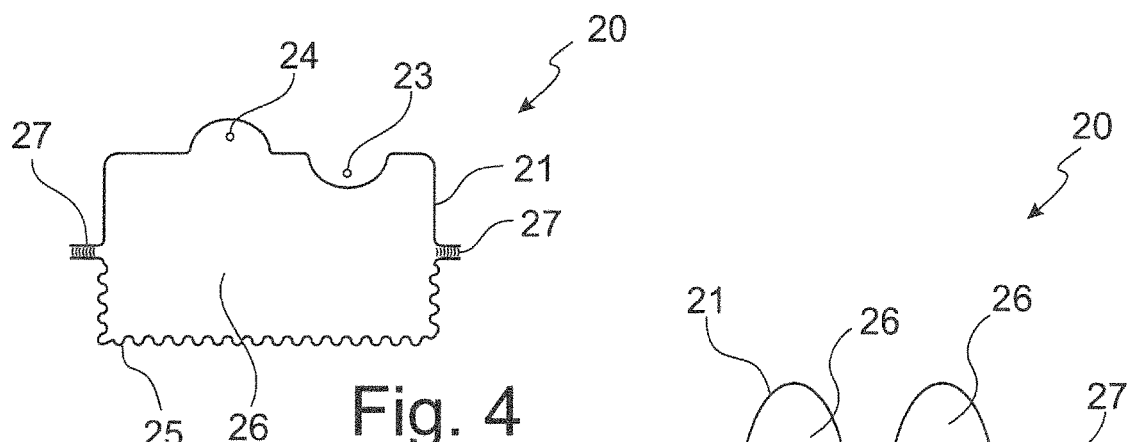
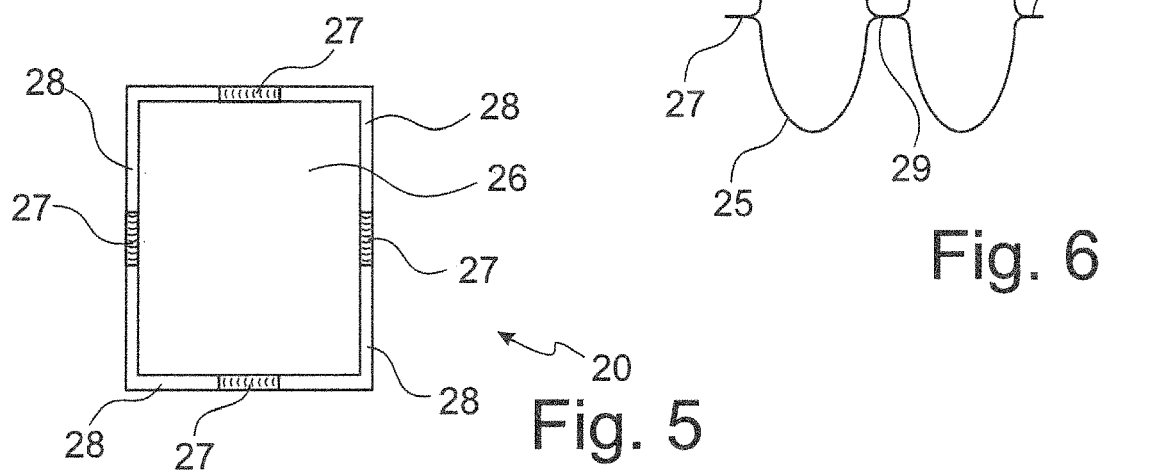

OPERATING FLUID CONTAINER HAVING A COMPENSATION CONTAINER FOR COMPENSATING FOR PRESSURE FLUCTUATIONS IN THE OPERATING FLUID CONTAINER

This application is the national stage (Rule 371) of international application No. PCT/EP2018/068842 filed 10 Jul. 2018.

FILED

The present invention relates to an operating fluid container having a compensation container, situated in an operating fluid container interior, for compensating for pressure fluctuations within the operating fluid container interior, the compensation container being at least indirectly fluidically connected to the atmosphere or the surroundings.

BACKGROUND

In the following discussion, reference is made to operating fluid containers that are designed as fuel containers or as fuel tanks. Within the meaning of the invention, operating fluid containers are in particular, but not exclusively, fuel containers (for gasoline or diesel fuel) for motor vehicles, urea tanks, windshield washer fluid reservoirs, oil reservoirs, auxiliary fluid containers, or additive tanks for motor vehicles. Containers of the above-mentioned types are often manufactured by extrusion blow molding, in particular high-density polyethylene (HDPE) being suitable for manufacturing extrusion blow-molded containers. In addition, such operating fluid containers may be manufactured using an injection molding process. Furthermore, such operating fluid containers may also be manufactured by rotational sintering. Operating fluid containers made of metal may also be used.

In motor vehicles having an internal combustion engine, when heat acts on a fuel container the fuel is likewise heated, so that the vapor pressure of the fuel increases and the fuel container is acted on by a corresponding internal pressure. The pressure rise within the fuel container would continue until the partial pressure of the fuel inside the fuel container is balanced with the vapor pressure of the fuel at the temperature in question. At high ambient temperatures, the partial pressure and the resulting internal pressure of the fuel container are higher than at low ambient temperatures. The fuel container is subjected to deformation under the action of such internal pressure.

For venting, a fuel container has at least one vent valve that is fluidically connected to a vent line for dissipating the positive pressure to the atmosphere. In particular for a fuel container that is designed for gasoline, its vent line is fluidically connected to an activated carbon filter for conducting and filtering fuel vapors. The gases filtered by the activated carbon filter pass through the activated carbon filter and are emitted to the atmosphere. The activated carbon filter is purged by intake air during operation of the internal combustion engine, so that fuel vapors bound in the activated carbon may be supplied to the internal combustion engine. The absorption capacity of the activated carbon filter may be limited due to the purging operation with intake air.

Motor vehicles having a hybrid drive, i.e., having an internal combustion engine as well as an electric motor for the drive of the motor vehicle, require a fuel container that can withstand elevated internal pressures. In such hybrid motor vehicles, due to the reduced operating time of the internal combustion engine, an activated carbon filter that is fluidically connected to the fuel container is purged to a lesser degree, since the activated carbon filter cannot be purged in the electrical operating phase of the motor vehicle. Therefore, in electrical operating phases of the motor vehicle the activated carbon filter should not be loaded with hydrocarbons, so that gas exchange should be prevented during the electrical operating phase; therefore, it would be advantageous for the fuel container to have a more rigid and/or pressure-resistant design.

It is known from the prior art to brace the fuel container using wrappings and/or reinforcement elements within the fuel container.

However, the manufacture of wrapped fuel containers is complicated and therefore costly. In addition, the geometry that can be effectively wrapped limits the freedom in design, and thus, the utilizable volume.

Reinforcement elements within a fuel container are now being successfully used, so that fuel containers with such a design withstand elevated internal pressures and also elevated negative pressures; however, reinforcement elements situated in the fuel container and connected to the fuel container walls result in a reduction in the usable volume of the fuel container.

WO 2016/012284 A1 describes a fuel container, having a volume-modifying element in its interior which is fluidically connected to the atmosphere via an optional adsorption device for adsorbing gaseous fuel components. The volume-modifying element has an elastic design, so that in the event of positive pressure in the fuel container interior with respect to the atmosphere, a compensation volume of the volume-modifying element decreases, whereas in the event of negative pressure in the fuel container interior with respect to the atmosphere, the compensation volume increases.

In the fuel container known from WO 2016/012284 A1, there is the problem that the volume-modifying element in the expanded state may come into contact with built-in parts of the fuel container, so that the volume-modifying element as well as the built-in parts of the fuel container that come into contact with it may be damaged. In addition, due to the elastic design of the volume-modifying element, optimal use is not made of the volume-modifying element of the fuel container interior on account of the uncontrolled expansion and compression movement of the volume-modifying element, so that the fuel container and the volume-modifying element must have a relatively large design. In addition, the elastic design of the volume-modifying element results in the problem that the wall of the volume-modifying element has a reduced barrier property, so that a relatively large quantity of hydrocarbons may continue to diffuse through the wall of the volume-modifying element in its compensation volume.

SUMMARY

The object of the present invention is to provide an improved operating fluid container having increased long-term stability, improved space utilization, and improved barrier properties for gaseous operating fluid components.

In particular, the object underlying the present invention is achieved by an operating fluid container for a motor vehicle for accommodating an operating fluid, having a compensation container that is at least indirectly fluidically connected to the atmosphere, wherein the compensation container is situated within the operating fluid container in such a way that an outer surface of a compensation container upper shell is situated opposite from an inner surface of an operating fluid container upper shell, wherein in the event of positive pressure in the operating fluid container relative to the atmosphere, a compensation container volume decreases; and in the event of negative pressure in the operating fluid container relative to the atmosphere, the compensation container volume increases. The operating fluid container according to the invention is characterized in that the compensation container upper shell opposite from the operating fluid container upper shell has a shape, at least in sections, that is complementary to the operating fluid container upper shell.

The operating fluid container according to the invention has the advantage that the available operating fluid container interior has improved usability, since due to the at least partial complementary design of the compensation container upper shell with respect to the operating fluid container upper shell, the compensation container lies closely against the operating fluid container. In addition, the operating fluid container according to the invention has the advantage that built-in parts situated in the operating fluid container, for example valves, lines, nipples, or the like, are subjected to lower forces, or even no forces, by the compensation container during expansion and contraction of the compensation container. This is because the compensation container upper shell essentially maintains its shape, regardless of whether the compensation container is in an expanded or in a compressed state.

The compensation container is situated in the operating fluid container interior of the operating fluid container. As a result, an operating fluid is fillable into the operating fluid container interior.

The fluid connection of the compensation container to the atmosphere is preferably established by means of a vent line.

The material of the compensation container has a flexible design. This feature also distinguishes the compensation container of the operating fluid container according to the invention from the volume-modifying element known from WO 2016/012284 A1, which has an elastic design.

Since the compensation container volume decreases in the event of positive pressure in the operating fluid container with respect to the atmosphere, and the compensation container volume decreases in the event of negative pressure in the operating fluid container with respect to the atmosphere, the compensation container thus has a variable compensation container volume.

The compensation container upper shell is the wall area of the compensation container which in the installation position of the operating fluid container forms the upper wall of the compensation container. The same applies for the operating fluid container upper shell.

The feature, according to which the compensation container upper shell opposite from the operating fluid container upper shell has a shape that is complementary to the operating fluid container upper shell, may also be expressed such that the compensation container upper shell has a topology that corresponds to a negative of a topology of an operating fluid container upper shell. The topology of the operating fluid container upper shell is understood to mean the spatial relationships of the inner surface of the operating fluid container upper shell with respect to one another. The topology of the compensation container upper shell is understood to mean the spatial relationships of the outer surface of the compensation container upper shell with respect to one another.

In addition, the feature, according to which the compensation container upper shell opposite from the operating fluid container upper shell has a shape that is complementary to the operating fluid container upper shell, may be expressed such that the compensation container upper shell, at least in sections, engages with a contour of the inner surface of the operating fluid container upper shell.

The shape of the compensation container upper shell, and thus the topology of the outer surface of the compensation container upper shell, is essentially independent of a pressure difference between the atmosphere and the internal pressure in the operating fluid container.

The shape of the outer surface of the compensation container upper shell is preferably also adapted [to] built-in parts, for example valves and/or lines and the like, situated in/on the operating fluid container upper shell.

The shapes of the compensation container upper shell and/or of the compensation container lower shell may be adapted in such a way that built-in parts, which are mounted on the operating fluid container upper shell and/or on the operating fluid container lower shell, for example, are recessed from the compensation container upper shell and/or the compensation container lower shell.

The compensation container upper shell may also be referred to as the compensation container top wall.

The compensation container is preferably formed by thermoforming a film blank or multiple film blanks. With this type of manufacture, the compensation container upper shell may be precisely adapted to the shape of the operating fluid container upper shell.

The compensation container, in particular the compensation container upper shell, is also preferably also manufactured by an injection molding process. With this type of manufacture, the compensation container upper shell may be precisely adapted to the shape of the operating fluid container upper shell.

It is also possible to manufacture the compensation container by joining multiple film blanks to form a three-dimensional structure.

Furthermore, it is also possible to manufacture the compensation container by joining two flat film blanks to local connecting points. In the process, the two films are joined next to a circumferential joining seam for media leak-tightness in selected areas within the circumferential joining seam, so that in the expanded state of the compensation container, tension rod anchors are formed which in conjunction with the circumferential seam result in a defined contour of the compensation container, in particular in the expanded state.

The operating fluid container is preferably designed in such a way that in a compressed state of the compensation container, the compensation container upper shell has a shape, at least in sections, that is complementary to the operating fluid container upper shell.

In the compressed state, the pressure within the operating fluid container is greater than the atmospheric pressure surrounding the operating fluid container. In the compressed state, the compensation container has a reduced compensation container volume compared to a maximum compensation container volume. It is also possible for the compensation container volume to have its minimum design value in the compressed state of the compensation container.

Furthermore, the operating fluid container is preferably designed in such a way that in the expanded state of the compensation container, the compensation container upper shell has a shape, at least in sections, that is complementary to the operating fluid container upper shell.

The operating fluid container having such a design has the advantage that, despite a possible maximum expansion of the compensation container, built-in parts or mounting parts situated in particular in/on the operating fluid container upper shell are acted on by no force or with reduced force by the compensation container. The operating fluid container thus has increased long-term stability. In addition, damage to the compensation container is avoided.

In the expanded state, the pressure within the operating fluid container is less than the atmospheric pressure surrounding the operating fluid container. The compensation container preferably has its maximum design capacity in the expanded state, depending on the filling level.

The operating fluid container is preferably designed in such a way that the compensation container upper shell and a compensation container lower shell have different rigidities.

The operating fluid container having such a design has the advantage that the compensation container undergoes a defined expansion and contraction movement during pressure changes in the operating fluid container interior. This is because only the shell of the compensation container, which has the lower rigidity, will undergo an expansion or contraction movement during a pressure change. As a result, either the shape of the compensation container upper shell, or preferably the shape of the compensation container lower shell, changes during a pressure change within the operating fluid container.

In addition, the operating fluid container is preferably designed in such a way that the compensation container upper shell and a compensation container lower shell have different flexural strengths.

Furthermore, the operating fluid container is preferably designed in such a way that the compensation container upper shell has a greater rigidity than the compensation container lower shell.

The operating fluid container having such a design has the advantage that in the event of pressure fluctuations within the operating fluid container, solely or primarily the compensation container lower shell undergoes expansion and contraction movements. This provides even better protection of built-in parts and mounting parts situated in/on the operating fluid container upper shell. In addition, for an operating fluid container having such a design, use may be made of its operating fluid container interior in a particularly effective manner, since due to the adaptation or close fit of the compensation container upper shell to the operating fluid container upper shell, the corresponding space of the operating fluid container is always utilized.

Alternatively, the operating fluid container may be designed in such a way that the compensation container upper shell has less rigidity than a compensation container lower shell.

The operating fluid container is preferably designed in such a way that a thickness of the compensation container upper shell is greater than a thickness of a compensation container lower shell (25).

The operating fluid container having such a design has the advantage that the compensation container has decreased permeability for gaseous operating fluid container components such as hydrocarbons when there is reduced mechanical stress on any built-in parts or mounting parts. Since the compensation container upper shell is thicker than the compensation container lower shell, the former may have a lower permeability for gaseous operating fluid components. The compensation container lower shell may thus have a thinner design, and may have a greater permeability for gaseous operating fluid components.

Alternatively, the operating fluid container may be designed in such a way that a thickness of the compensation container upper shell is less than or equal to a thickness of the compensation container lower shell.

The operating fluid container is preferably designed in such a way that the compensation container upper shell has a reinforcement structure for increasing the rigidity of the compensation container upper shell.

The reinforcement structure is preferably implemented in the form of reinforcement ribs or in the form of a reinforcement grid that are/is formed on the outer surface and/or on the inner surface of the compensation container upper shell. There are no limitations with regard to the design of the reinforcement structure.

The operating fluid container is preferably designed in such a way that the compensation container is detachably fastened in the operating fluid container interior.

The operating fluid container having such a design has the advantage that it is easily replaceable with a new compensation container in the event of damage to the compensation container. The detachable fastening of the compensation container preferably takes place by means of a hook and loop fastener.

The operating fluid container is preferably designed in such a way that the compensation container is joined to the operating fluid container upper shell at certain points, preferably via a spot weld, and/or over a partial area, preferably via a partial area weld.

The position of the compensation container within the operating fluid container is defined by an appropriate connection of the compensation container to the operating fluid container, so that any collisions with built-in parts during the expansion and/or contraction movement of the compensation container may be avoided in an even more effective manner.

A point connection and/or partial area connection also have/has the advantage that the connection does not hinder an expansion and/or contraction movement of the compensation container.

The compensation container upper shell is preferably joined to the operating fluid container upper shell or to a side wall of the operating fluid container by a spot weld or a partial area weld.

The operating fluid container is preferably designed in such a way that the compensation container upper shell and/or the compensation container lower shell have/has a barrier layer that is impermeable to gaseous components of the operating fluid.

The barrier layer is preferably designed as an EVOH layer. Furthermore, the barrier layer is preferably designed as a polyamide layer. The polyamide may contain linear polyamides and/or cyclic polyamides. By providing the barrier layer, even fewer gaseous components are emitted to the surroundings, so that an adsorption filter that is situated between the compensation container volume and the atmosphere, and that is preferably designed as an activated carbon filter or as a so-called honeycomb filter, may have a reduced size.

In addition, the operating fluid container is preferably designed in such a way that the compensation container upper shell and/or the compensation container lower shell have/has a multilayer structure.

Due to a multilayer structure of the compensation container upper shell, properties that are typically incompatible, such as good barrier properties for gaseous operating fluid components and good deformability in particular of the compensation container lower shell, may be combined with one another. An operating fluid container having such a design therefore has good volume utilization and low emission levels.

Moreover, the operating fluid container is preferably designed in such a way that the compensation container upper shell and/or the compensation container lower shell have/has a barrier layer that is sandwiched between two adhesion promoter layers, the outer sides of which are integrally joined to a polyethylene layer in each case.

The operating fluid container is preferably designed in such a way that the compensation container upper shell is joined to the compensation container lower shell by a circumferential weld.

Manufacture of such a compensation container is particularly simple. In addition, in particular the shape of the compensation container upper shell may be adapted to the shape of the operating fluid container upper shell in an even more effective manner.

Furthermore, the operating fluid container is preferably designed in such a way that it has a splash protection wall situated in the operating fluid container interior, the compensation container being situated within the operating fluid container interior, resting against the splash protection wall.

The positioning of the compensation container is even further improved with an appropriate design of the operating fluid container. In addition, forces that are caused by the movement of the operating fluid during the driving operation of the motor vehicle and exerted on the compensation container may be absorbed in an improved manner, so that the operating fluid container having such a design has improved long-term stability.

The operating fluid container is preferably designed in such a way that a cross-sectional area of the compensation container, in a top view of the operating fluid container, corresponds to more than 30% of a cross-sectional area of the operating fluid container.

The cross-sectional area of the compensation container, in a top view of the operating fluid container, i.e., of the operating fluid container upper shell, more preferably corresponds to more than 40% of the cross-sectional area of the operating fluid container. The cross-sectional area of the compensation container, in a top view of the operating fluid container, more preferably corresponds to more than 50% of the cross-sectional area of the operating fluid container. The cross-sectional area of the compensation container, in a top view of the operating fluid container, more preferably corresponds to more than 60% of the cross-sectional area of the operating fluid container. The cross-sectional area of the compensation container, in a top view of the operating fluid container, more preferably corresponds to more than 70% of the cross-sectional area of the operating fluid container. The cross-sectional area of the compensation container, in a top view of the operating fluid container, more preferably corresponds to more than 80% of the cross-sectional area of the operating fluid container. The cross-sectional area of the compensation container, in a top view of the operating fluid container, more preferably corresponds to the cross-sectional area of the operating fluid container.

The larger the cross-sectional area of the compensation container, the smaller a lift of the compensation container lower shell needs to be in order to ensure the desired pressure compensation properties.

In addition, the operating fluid container is preferably designed in such a way that a compensation container lower shell has a shape, at least in sections, that is complementary to the compensation container upper shell.

With a compensation container having such a design, the available operating fluid container interior has an even greater improvement in utilization.

According to another advantageous embodiment, the operating fluid container is designed in such a way that a compensation container lower shell has a shape, at least in sections, that is complementary to an operating fluid container lower shell.

With an operating fluid container having such a design, in the event of expansion of the compensation container even further built-in parts, not situated in the operating fluid container upper shell, are protected from an action of force or an excessively large action of force due to the compensation container.

BRIEF DESCRIPTION OF THE DRAWINGS

Further advantages, particulars, and features of the invention result from the exemplary embodiments explained below. In the figures:

FIG. 3 shows a schematic cross-sectional illustration of an operating fluid container according to yet another embodiment of the present invention;

FIGS. 4 and 4A show schematic cross-sectional illustrations of a two-part compensation container whose compensation container upper shell is joined to the compensation container lower shell via a circumferential weld seam;

FIG. 5 shows a schematic cross-sectional illustration of a multipart compensation container having film blanks that are welded to one another; and FIG. 6 shows a schematic cross-sectional illustration of a compensation container in which the film blanks, in addition to a circumferential joining seam, are joined together at a local connecting point.

DETAILED DESCRIPTION

In the following description, identical components or identical features are denoted by the same reference symbols, so that a description of a component with reference to one figure also applies to the other figures, thereby avoiding a repetitive description. In addition, individual features that have been described in conjunction with one embodiment may also be used separately in other embodiments.

Figure 1A:
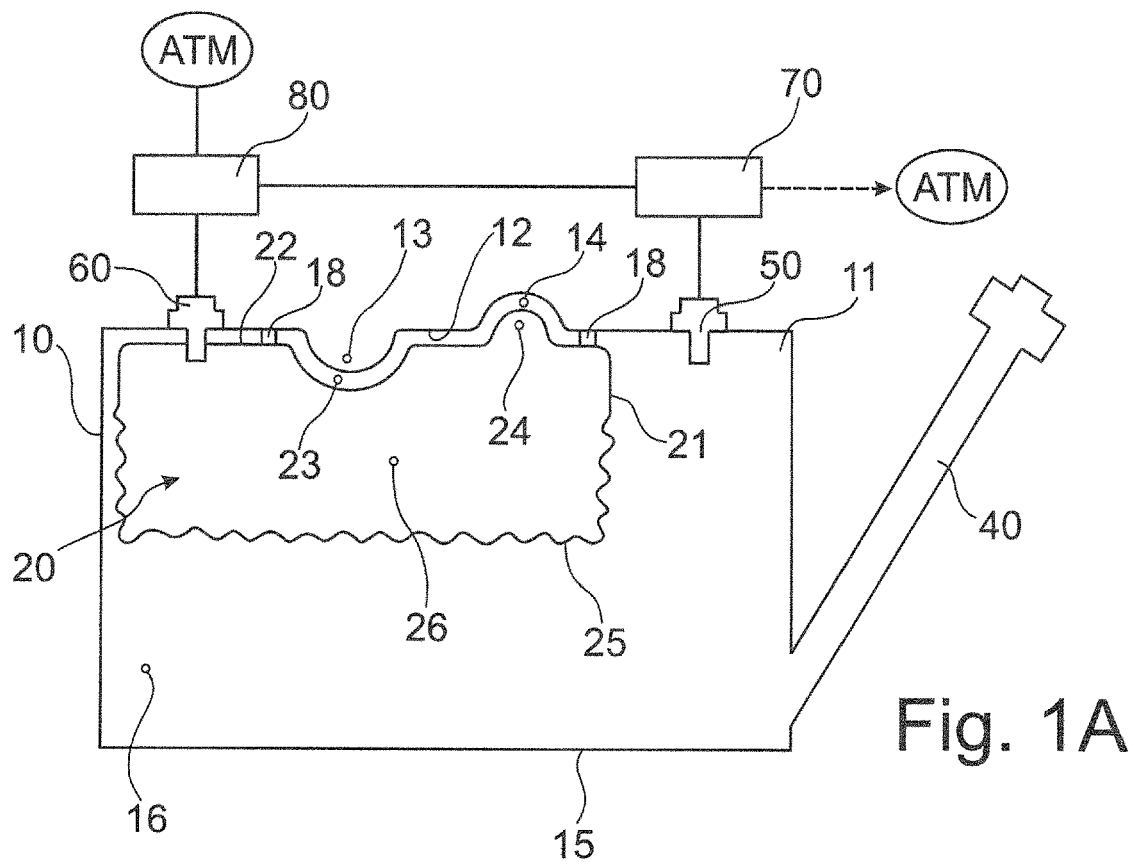
FIGS. 1A through 1C show schematic cross-sectional illustrations of an operating fluid container according to the invention designed as a fuel container, with an integrated compensation container at different filling levels.
Figure 1B:
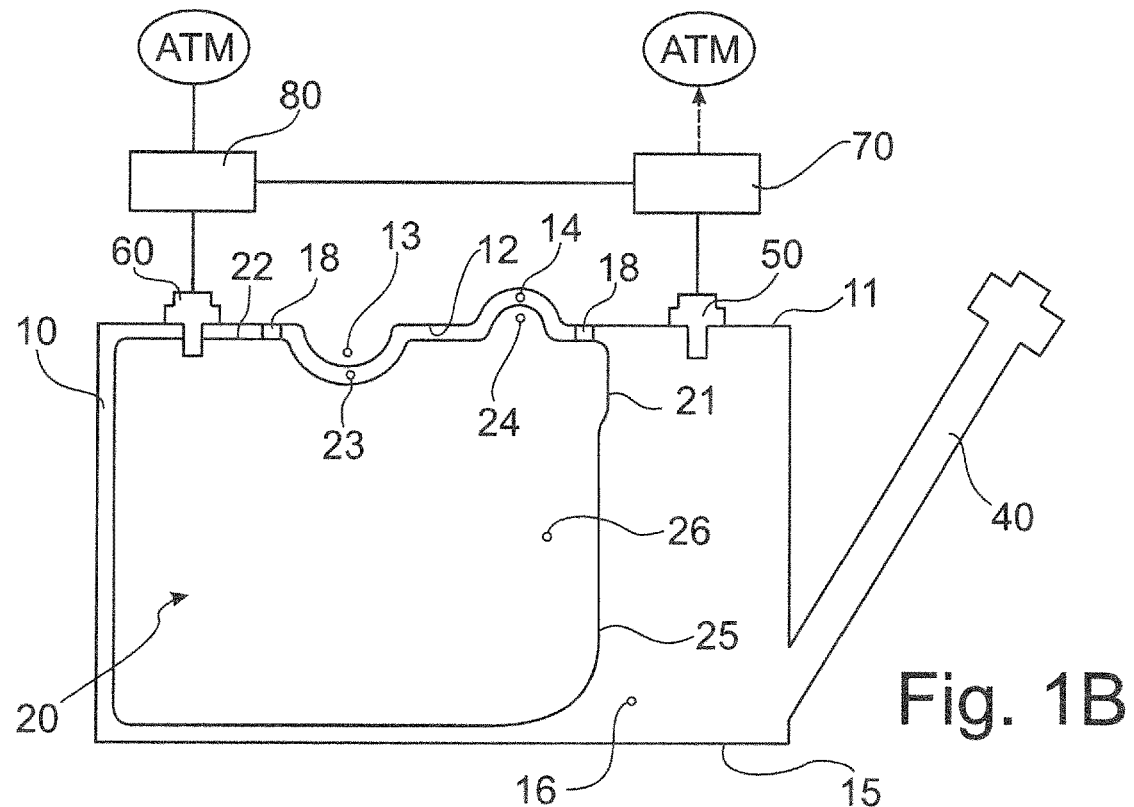
Figure 1C:
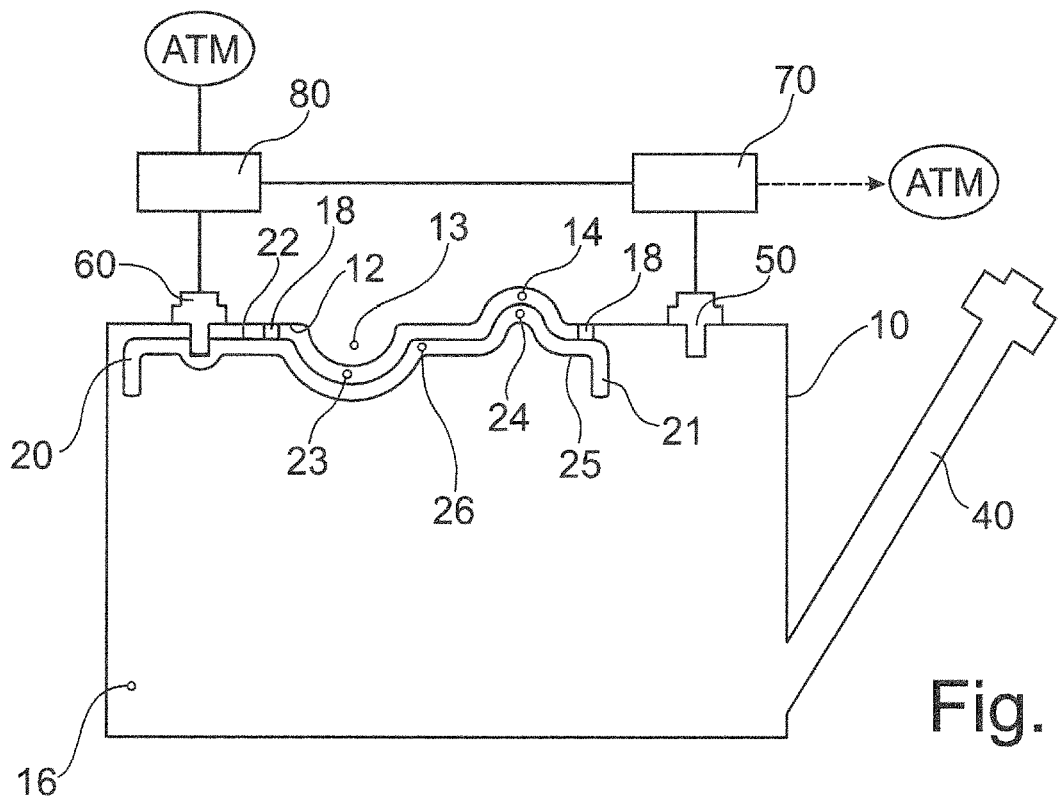

FIGS. 1A, 1B, and 1C show schematic cross-sectional illustrations of an operating fluid container 10 according to the invention according to a first embodiment of the present invention. In the illustrated exemplary embodiment, the operating fluid container 10 is designed as a fuel container 10. The operating fluid container 10 has a compensation container 20 that is fluidically connected to the atmosphere ATM. In the illustrated exemplary embodiments, the compensation container 20 is fluidically connected to the atmosphere via a filter device 80. The filter device 80 may be a honeycomb filter and/or a dust filter, for example. The filter device may also be designed as an adsorption filter. In particular, it is possible for the filter device 80 to be designed as an activated carbon filter.

The compensation container 20 has a compensation container upper shell 21 and a compensation container lower shell 25. The compensation container upper shell 21 and the compensation container lower shell 25 have different rigidities. In the illustrated exemplary embodiments, the compensation container upper shell 21 has a greater rigidity than the compensation container lower shell 25.

The feature, according to which the compensation container upper shell 21 has a greater rigidity than the compensation container lower shell 25, may be achieved in that a thickness (which may also be referred to as a wall thickness) of the compensation container upper shell 21 is greater than a thickness (which may also be referred to as a wall thickness) of the compensation container lower shell 25. It is also possible for the feature, according to which the compensation container upper shell 21 has a greater rigidity than the compensation container lower shell 25, to be achieved by using different materials, having different material properties, for the compensation container upper shell 21 and the compensation container lower shell 25. It is also possible for the feature, according to which the compensation container upper shell 21 has a greater rigidity than the compensation container 20, to be achieved by providing the compensation container upper shell 21 with a reinforcement structure, not illustrated in the figures. The reinforcement structure may be reinforcement ribs or a reinforcement grid, for example, that are/is formed on an outer surface 22 and/or an inner surface of the compensation container upper shell 21. There are no limitations with regard to the design of the reinforcement structure.

It is apparent from FIGS. 1A through 1C that the compensation container 20 is situated within an operating fluid container interior 16 of the operating fluid container 10. The outer surface 22 of the compensation container upper shell 21 is situated opposite from an inner surface 12 of an operating fluid container upper shell 11. In the event of positive pressure in the operating fluid container 10 with respect to the atmosphere ATM, a compensation container volume 26 decreases, whereas in the event of negative pressure in the operating fluid container 10 with respect to the atmosphere ATM, the compensation container volume 26 increases. In FIG. 1B the compensation container 20 is illustrated in an expanded state in which the compensation container volume 26 is at a maximum. In contrast, in FIG. 1C the compensation container 20 is illustrated in a compressed state in which the compensation container volume 26 is at a minimum. In FIG. 1A, the compensation container 20 is illustrated in a state in which the compensation container volume 26 assumes an intermediate value between a maximum compensation container volume and a minimum compensation container volume.

It is apparent that the compensation container upper shell 21 opposite from the operating fluid container upper shell 11 has a shape, at least in sections, that is complementary to the operating fluid container upper shell 11. Thus, an indentation 13 in the operating fluid container upper shell 11 is accommodated in a corresponding indentation 23 in the compensation container upper shell 21. In addition, in the illustrated exemplary embodiment a protrusion 24 of the compensation container upper shell 21 is accommodated in a protrusion 14 of the operating fluid container upper shell 11. The compensation container upper shell 21 thus has a topology that corresponds to a negative of a topology of the operating fluid container upper shell 11.

Since the rigidity of the operating fluid container upper shell 21 is greater than the rigidity of the operating fluid container lower shell 25, the change in a compensation container volume 26 is achieved in that primarily the shape of the compensation container lower shell 25 changes in the event of a pressure change in the operating fluid container 10. It is apparent from FIG. 1B that also in the expanded state of the compensation container 20, the compensation container upper shell 21 has a shape that is complementary to the operating fluid container upper shell 11. In turn, it is apparent from FIG. 1C that also in the compressed state of the compensation container 20, the compensation container upper shell 21 has a shape that is complementary to the operating fluid container upper shell 11.

Figure 2:
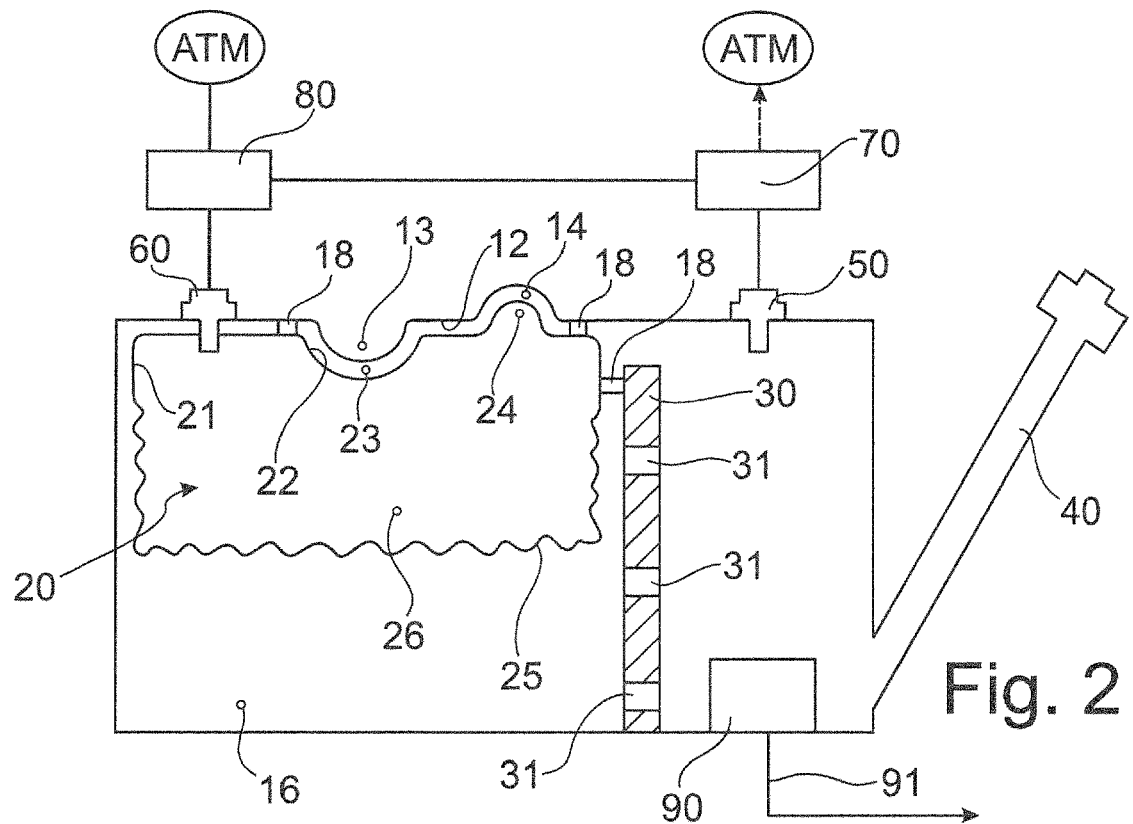
FIG. 2 shows a schematic cross-sectional illustration of an operating fluid container according to another embodiment of the present invention.

FIG. 2 illustrates an operating fluid container 10 according to another embodiment of the present invention. The operating fluid container 10 has a splash protection wall 30 situated in the operating fluid container interior 16. The compensation container 20 is situated within the operating fluid container interior 16, resting against the splash protection wall 30.

It is apparent that the splash protection wall has multiple through openings 31 through which the operating fluid can pass. It also apparent that in the illustrated exemplary embodiment the compensation container 20 is connected to the splash protection wall 30 via a connection 18. However, this is not absolutely necessary.

It is also apparent that a fluid conveying device 90, preferably designed as a pump 90, is situated in the operating fluid container interior 16. The pump 90 is situated between an opening of a filling tube 40 into the operating fluid container interior 16 and the splash protection wall 30. Operating fluid may be conveyed from the operating fluid container 10 at an internal combustion engine, not illustrated in the figures, via a conveying line 91.

Of course, the operating fluid container 10 in the embodiment illustrated in FIGS. 1A through 1C also has a fluid conveying device 90, although this is not illustrated in FIGS. 1A through 1C.

It is apparent from all FIGS. 1A through 3 that the compensation container 20 is fastened in the operating fluid container 10 via connections 18. These connections 18 are spot welds and/or surface welds. It is also possible to detachably fasten the compensation container 20 within the operating fluid container 10.

Furthermore, it is apparent from FIGS. 1A through 3 that venting and/or ventilation of the operating fluid container interior 60 take(s) place via a service valve and/or a refueling vent valve 50. This valve is in turn fluidically connected to an adsorption filter 70 that is either directly fluidically connected to the atmosphere ATM or fluidically connected to the atmosphere ATM via the filter device 80. The adsorption filter 70 and/or the filter device 80 are/is preferably fluidically connected to an intake tract of an internal combustion engine, not illustrated in the figures.

FIG. 3 illustrates an operating fluid container 10 according to another embodiment of the present invention. In the illustrated exemplary embodiment, the compensation container 20 is designed in such a way that the compensation container lower shell 25, at least in an intermediate state in which the compensation container volume 26 has an intermediate value between a minimum compensation container volume and a maximum compensation container volume, extends at an angle inside the operating fluid container interior 16 in the installation position of the operating fluid container 10. This has the advantage that air inclusions, which would reduce the effectively utilizable volume of the operating fluid container 10, do not form below the compensation container lower shell 25. When the compensation container 20 is expanded and the compensation container volume 26 is thus at a maximum, the compensation container lower shell 25 takes on the shape illustrated in dashed lines in FIG. 3.

FIG. 4 shows a compensation container 20 according to another embodiment, by itself. The compensation container upper shell 21 is joined to the compensation container lower shell 25 via a circumferential weld seam 27. It is apparent that the compensation container 20 has a protrusion 24 and an indentation 23. However, this is not essential to the invention, provided that the compensation container upper shell 21 has a shape that is complementary to a shape of an operating fluid container upper shell 11.

Figure 4A:
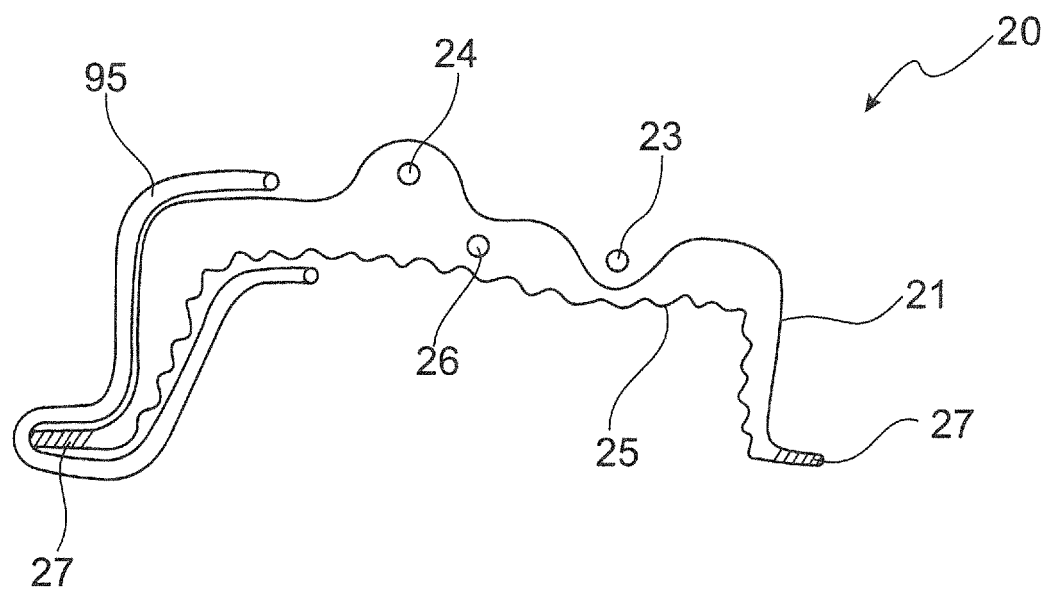

FIG. 4A shows a compensation container 20 according to another embodiment, by itself. The compensation container 20 illustrated in FIG. 4A is based on the compensation container illustrated in FIG. 4, the compensation container 20 illustrated in FIG. 4A being shown in a state (which is compressed in comparison to FIG. 4) in which the compensation container lower shell 25 lies closely against the compensation container upper shell 21 so that the compensation container volume 26 is reduced in comparison to the state illustrated in FIG. 4. The compensation container 20 illustrated in FIG. 4A, in addition to the compensation container 20 shown in FIG. 4, has a flexible or bendable ventilation tube 95 that is fastened to the outer surface 22 of the compensation container upper shell 21 and to an outer surface of the compensation container lower shell 25, the two ends of the ventilation tube 95 being in fluid communication with one another. As a result, in particular for a compressed compensation container 20, an inclusion of an air bubble/gas bubble below the compensation container lower shell 25 is prevented, since air or gas can be discharged via the ventilation tube 95 from the area below the compensation container lower shell 25 into the area above the compensation container upper shell 21, so that also the volume below the compensation container lower shell 25 can be occupied by the operating fluid.

It is apparent from FIG. 5 that a compensation container 20 may also be assembled using multiple film blanks 28. These film blanks 28 are joined together via weld seams 27. With an appropriate design, the compensation container 20 may be adapted to a geometry of an operating fluid container 10 in a particularly simple manner.

FIG. 6 illustrates a compensation container 20 according to another embodiment, by itself. In the compensation container 20 illustrated in FIG. 6, in addition to a circumferential weld seam 27 the compensation container upper shell 21 is joined to the compensation container lower shell 25 via a connecting point 29. Thus, in an expanded state of the compensation container 20, tension rod anchors are formed which in conjunction with the circumferential seam 27 result in a defined contour of the compensation container 20, in particular in the expanded state.

LIST OF REFERENCE SYMBOLS 10 operating fluid container
11 operating fluid container upper shell
12 inner surface (of the operating fluid container upper shell)
13 indentation (in the operating fluid container upper shell)
14 protrusion (of the operating fluid container upper shell)
15 operating fluid container lower shell
16 operating fluid container interior
18 connection/spot weld/surface weld
20 compensation container
21 compensation container upper shell
22 outer surface (of the compensation container upper shell)
23 indentation (in the compensation container upper shell)
24 protrusion (of the compensation container upper shell)
25 compensation container lower shell
26 compensation container volume
27 weld seam (of the compensation container)
28 film blank (of the compensation container)
29 connecting point (of the compensation container)
30 splash protection wall
31 through opening (in the splash protection wall)
40 filling tube (of the operating fluid container)
50 service valve and/or refueling vent valve
60 ventilation device/ventilation connection/ventilation valve
70 adsorption filter
80 filter device/second adsorption filter/honeycomb filter/dust filter
90 conveying module/fluid conveying device/pump
91 conveying line
95 ventilation tube
ATM atmosphere/surroundings

What is claimed is:

1. An operating fluid container for a motor vehicle for accommodating an operating fluid, wherein the operating fluid container has a compensation container that is at least indirectly fluidically connected to the atmosphere, the operating fluid container further comprising:
   wherein the compensation container is situated within the operating fluid container in such a way that an outer surface of a compensation container upper shell is situated opposite from an inner surface of an operating fluid container upper shell;
   wherein, in the event of positive pressure in the operating fluid container relative to the atmosphere, a compensation container volume decreases; and
   wherein, in the event of negative pressure in the operating fluid container relative to the atmosphere, the compensating container volume increases,
   wherein the compensation container upper shell opposite from the operating fluid container upper shell has a shape, at least in sections, that is complementary to the operating fluid container upper shell,
   wherein the compensation container upper shell and/or the compensation container lower shell have/has a multilayer structure, and
   wherein the compensation container upper shell and/or the compensation container lower shell have/has a barrier layer that is sandwiched between two adhesion promoter layers, the outer sides of which are integrally joined to a polyethylene layer in each case.

2. The operating fluid container according to claim 1, wherein in a compressed state of the compensation container, the compensation container upper shell has a shape, at least in sections, that is complementary to the operating fluid container upper shell.

3. The operating fluid container according to claim 1, wherein in the expanded state of the compensation container, the compensation container upper shell has a shape, at least in sections, that is complementary to the operating fluid container upper shell.

4. The operating fluid container according to claim 1, wherein the compensation container upper shell and a compensation container lower shell have different rigidities.

5. The operating fluid container according to claim 4, wherein the compensation container upper shell has a greater rigidity than the compensation container lower shell.

6. The operating fluid container according to claim 1, wherein a thickness of the compensation container upper shell is greater than a thickness of a compensation container lower shell.

7. The operating fluid container according to claim 1, wherein the compensation container upper shell has a reinforcement structure for increasing the rigidity of the compensation container upper shell.

8. The operating fluid container according to claim 1, wherein the compensation container is detachably fastened in the operating fluid container interior.

9. The operating fluid container according to claim 1, wherein the compensation container is joined to the operating fluid container upper shell at certain points and/or over a partial area.

10. The operating fluid container according to claim 1, wherein the compensation container upper shell and/or the compensation container lower shell have/has a barrier layer that is impermeable to gaseous components of the operating fluid.

11. The operating fluid container according to claim 1, wherein the compensation container upper shell is joined to the compensation container lower shell via a circumferential weld and/or a circumferential adhesive bond.

12. The operating fluid container according to claim 1, comprising the following features:
    the operating fluid container has at least one splash protection wall situated in the operating fluid container interior; and
    the compensation container is situated within the operating fluid container interior, resting against the splash protection wall.

13. The operating fluid container according to claim 1, wherein a cross-sectional area of the compensation container, in a top view of the operating fluid container, corresponds to more than 30% of a cross-sectional area of the operating fluid container.

14. The operating fluid container according to claim 1, wherein a compensation container lower shell has a shape, at least in sections, that is complementary to the compensation container upper shell.

15. The operating fluid container according to claim 1, wherein a compensation container lower shell has a shape, at least in sections, that is complementary to an operating fluid container lower shell.

16. The operating fluid container according to claim 1, wherein the compensation container upper shell has a multilayer structure.

17. The operating fluid container according to claim 1, wherein the compensation container lower shell has a multilayer structure.

18. The operating fluid container according to claim 1, wherein the compensation container upper shell has the barrier layer that is sandwiched between the two adhesion promoter layers, the outer sides of which are integrally joined to the polyethylene layer in each case.

19. The operating fluid container according to claim 1, wherein the compensation container lower shell has the barrier layer that is sandwiched between the two adhesion promoter layers, the outer sides of which are integrally joined to the polyethylene layer in each case.

20. The operating fluid container according to claim 1, wherein the compensation container upper shell and the compensation container lower shell have the barrier layer that is sandwiched between the two adhesion promoter layers, the outer sides of which are integrally joined to the polyethylene layer in each case.

* * * * *